Dec. 31, 1940. E. STUMP Re. 21,682
APPARATUS FOR SEPARATING AND CLEANING MATERIALS
Original Filed July 29, 1932 3 Sheets-Sheet 1
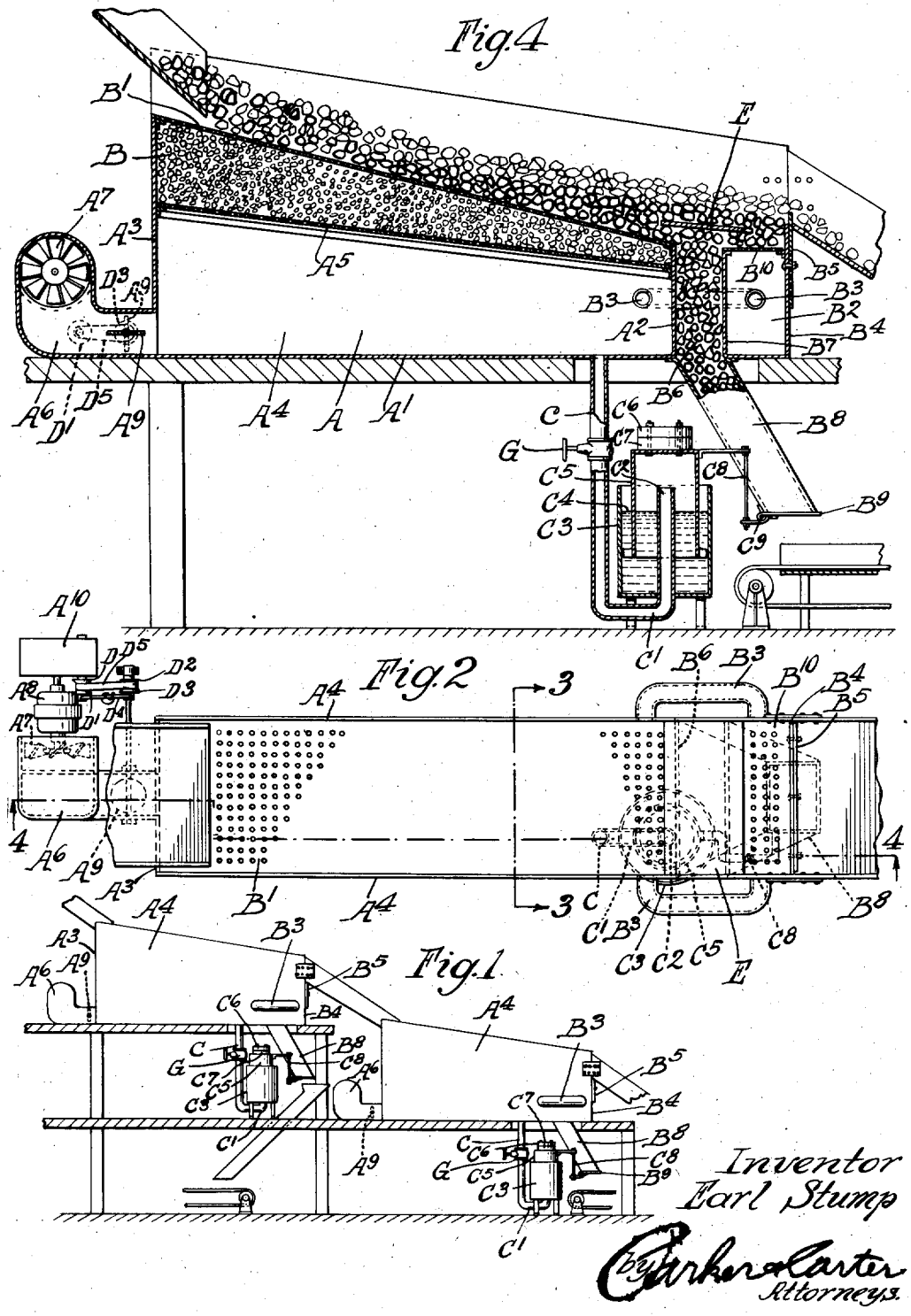

Dec. 31, 1940. E. STUMP Re. 21,682

APPARATUS FOR SEPARATING AND CLEANING MATERIALS

Original Filed July 29, 1932 3 Sheets-Sheet 2

Inventor
Earl Stump
by Parker & Carter
Attorneys

APPARATUS FOR SEPARATING AND CLEANING MATERIALS

Original Filed July 29, 1932 3 Sheets-Sheet 3

Inventor
Earl Stump
By Parker & Carter
Attorneys.

Reissued Dec. 31, 1940

Re. 21,682

UNITED STATES PATENT OFFICE 21,682

APPARATUS FOR SEPARATING AND CLEANING MATERIALS

Earl Stump, Harvey, Ill., assignor to Roberts and Schaefer Company, Chicago, Ill., a corporation of Illinois Original No. 2,086,584, dated July 13, 1937, Serial No. 625,767, July 29, 1932. Application for reissue July 8, 1938, Serial No. 218,253

11 Claims. (Cl. 209—475)

My invention relates primarily to apparatus for gravitally separating particles of different specific gravities and while it is especially applicable to the cleaning of coal by air, it is useful in connection with separating other materials both by the use of air and other fluid separating mediums. One object of my invention is to provide a machine which can be applied to the separation of fragmentary materials in one operation through a relatively wide range of sizing, thereby dispensing with the necessity of excessive preliminary screening.

Another object is to provide a material separating device which will be simple, light, inexpensive, of large capacity, take up a minimum of room, and have a minimum of vibration, whereby it becomes unnecessary to build special reinforcing or stiffened buildings or structures to house the same. Other objects of my invention will appear from time to time throughout the specification and claims.

My invention is illustrated more or less diagrammatically in the accompanying drawings, wherein Fig. 1 is a side elevation;

Fig. 2 is a plan view;

Fig. 4 is a section along the line 4—4 of Fig. 2;

Like parts are indicated by like characters throughout the several figures.

Figure 3:
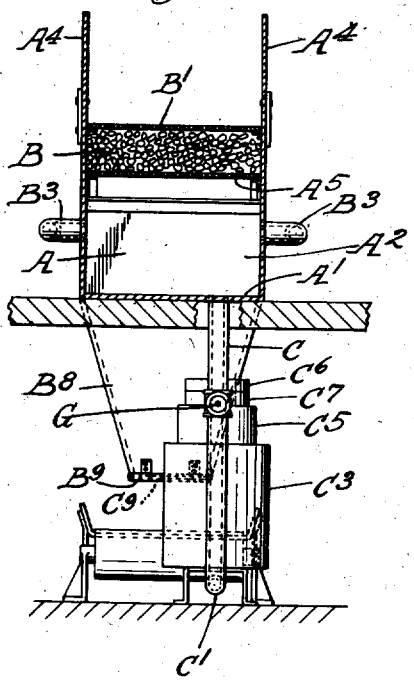
Fig. 3 is a section along the line 3—3 of Fig. 2.

A is an air chamber. It has a bottom A1, end walls A2, A3, side walls A4. It is bounded at the top by a perforate wall A5. A6 is an air duct discharging into the chamber A. Air is supplied to it and discharged therethrough by a fan or other suitable source of air under pressure A7. The fan is driven by a motor A8 in the usual manner. A9 is a butterfly valve interposed in the duct A6 between the fan and the chamber. A10 is a power transmission interposed between the motor and the butterfly valve which may be of any suitable form but preferably is adapted for easy and convenient speed adjustment so that the revolutions per minute of the butterfly valve may be conveniently and easily adjusted during operation of the machine.

Mounted on top of the air chamber A and between the side walls A4 which project upwardly above the chamber is a fixed resistance bed B, formed preferably of screened gravel, shot, sawdust, mineral wool, or any suitable material. This resistance bed is bounded at its upper side by a perforate screen or deck B1. The deck B1 is inclined to the wall A5 so that the thickness of the air resistance bed or filter decreases from one end to the other. The perforate plates B1 and A5 are fixed in position and so related with the resistance bed that the material therein remains at rest and furnishes at all times a fixed unchanging internal resistance bed to control the rate at which air escapes from the chamber A and so to control the pressure of air available along the deck surface B1. The walls A4 project above the deck surface B1 to form a trough bounded on its under side by the perforate plate B1, which plate is as indicated downwardly inclined. B2 is an auxiliary air chamber located beyond the chamber A and joined to it by a plurality of bleeder pipes B3 of such size that the air pressure in the chambers A and B2 is substantially the same. This chamber B2 is bounded on its opposed sides by the walls A4 which extend forwardly from the chamber A for that purpose and is bounded at its top by a perforate plate B10. B4 is the end wall of the device. It forms the end wall for the chamber B2, projects upwardly thereabove to a point above the lower end of the deck B1 and supports a weir or plate B5 mounted for vertical adjustment. B6 is a refuse discharge passage. It extends clear across the machine between the side walls A4. It is bounded at the rear by the wall A2, at the front by the rear wall B7 of the air chamber B2. This channel B6 inclines forwardly as indicated at B8 along the under side of the chamber B2 and is closed by a pivoted flap gate B9.

C is an air pipe. It communicates at one end with the interior of the chamber A. It terminates in a gooseneck C1 and has a discharge end C2 passing up through a water or liquid reservoir C3 to terminate above the level C4 of the fluid in the reservoir where it discharges into a float cup C5, which cup is immersed in the fluid. C6, C7 are adjustable weights mounted on the float cup C5, and C8 is a link interposed between the cup C5 and the shaft C9 which carries the pivoted flap gate B9 so that movement of the cup will move the flap gate.

Figure 5:
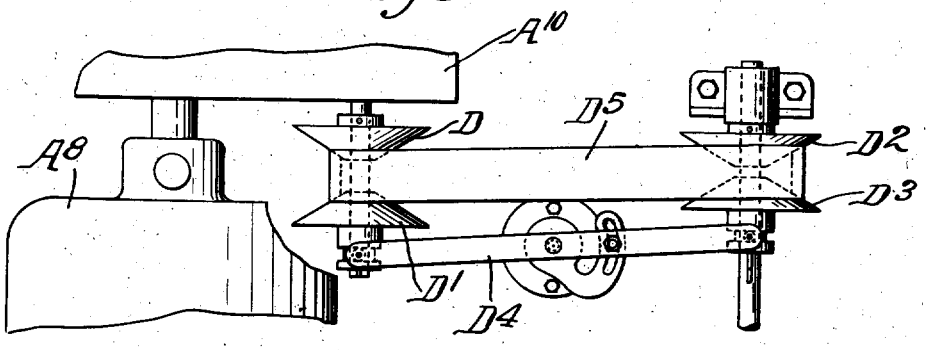
Fig. 5 is a detail of the butterfly valve drive.

The drive for the butterfly valves is shown in Fig. 5 and comprises opposed pairs of conical driving wheels D D1, D2 D3. A lever D4 varies in opposition the distance between the conical wheels of each pair. D5 is a flexible belt engaged between the opposed faces of these wheels so that as one pair approaches toward and the other pair recedes from one another, the flexible belt rides out farther from the center of rotation from one pair of wheels and closer to the center of rotation of the other pair so that by this method an accurate control of the speed of the butterfly valve is obtained.

The variant speed drive has been shown merely as illustrative of any suitable type of variable speed drive. It is understood that many different types may be used.

Figure 6:
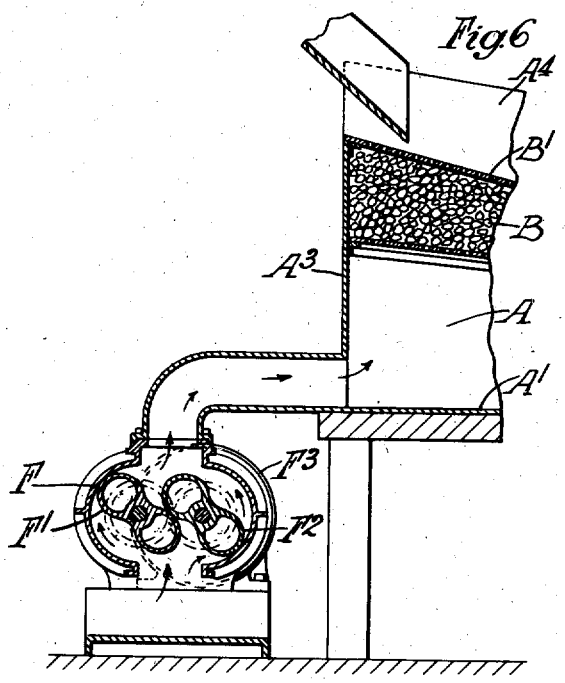
Fig. 6 is a diagrammatic view of a variant form of blower or pump.

In the modified form of the device shown in Fig. 6, there is substituted for the fan and butterfly valve a Roots type blower F having vanes F1, F2 driven by a motor F3, the speed of which can be controlled in any suitable manner. The Roots type blower, being a positive displacement pump, insures positive impulses to the air without the interposition of the butterfly valve.

E is a baffle plate extending clear across the deck, above the refuse discharge opening. It is preferably so positioned that it will be embedded in the refuse and always have above it and between it and the coal a bed of refuse material.

Intermediate between the air box and the control cup or control means is located the valve G which may be manually set to initially adjust the response of the control cup or member and so the response of the discharge means to the air pressure in the air flow box. It will be understood of course that when the device is in operation, the control cup constantly pulsates and there is a constant opening and closing, or movement in the direction of opening and closing, of the refuse valve. This is of course caused by the pulsations or variations in pressure in the air flow caused or imparted by the butterfly valve or other suitable means. This vibratory or pulsating movement of the refuse gate is of course important in that it tends to break up any accumulations of refuse in the discharge chamber.

The high resistance bed is preferably of marbles or shot or some smooth generally spherical objects because, while experience shows that so far as the control of the air pressure itself is concerned, most any resistance medium will do, the great difficulty lies in obtaining a resistance medium which will give the desired resistance to air flow and still will be immune from clogging by dust. This is of the utmost importance because experience shows that clogging takes place both as a result of dust entrained by the air as it passes upwardly through the resistance bed and also as a result of dust passing down from the treating deck into the resistance bed, being there lodged and caught and held when the air is turned off and the bed ceases to operate. The smooth walled passages are essential to prevent this clogging. They do not need to be perfectly straight; in fact, they can well be of constantly varying cross section, but they should be smooth walled because, if the walls are rough, dust particles catch, adhere and build up obstructions to the air flow. It is even better to have them of varying cross section because, if the cross section should be constant, there would be too little resistance to air flow and not enough eddy currents in the bed itself, and also there would be a greater chance of refuse bridging or clogging in the minute passages.

Figure 7:
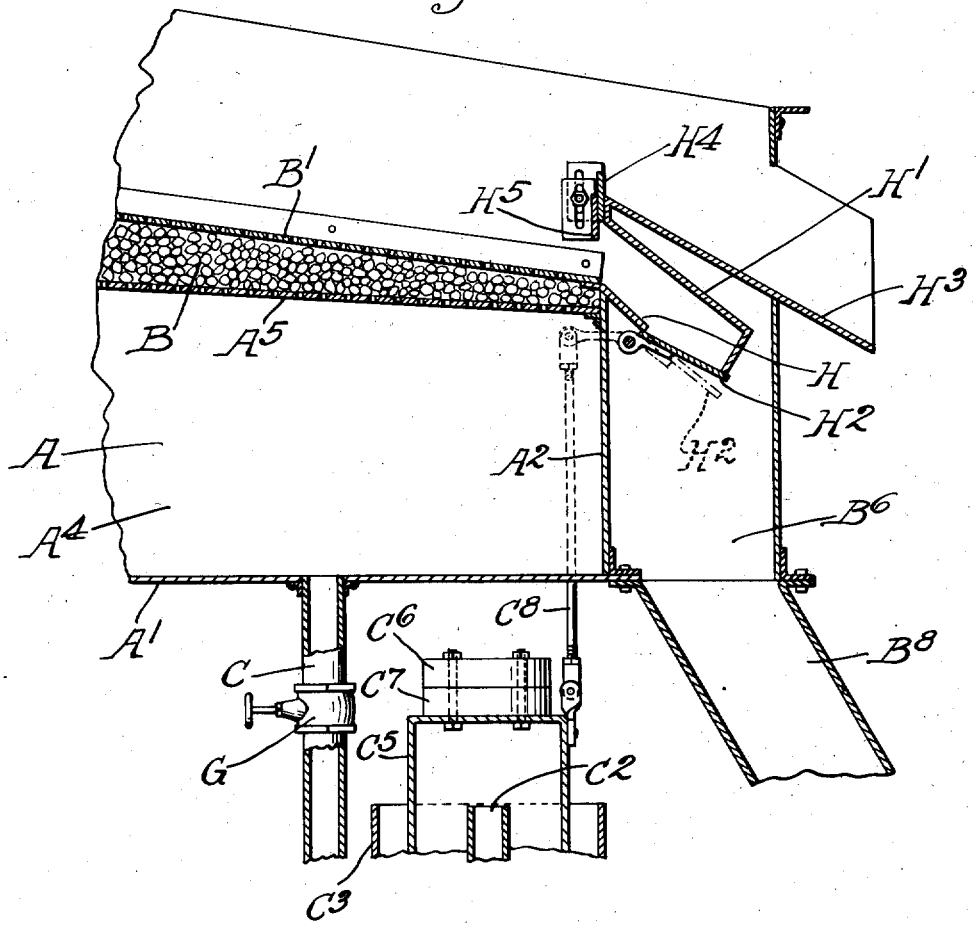
Fig. 7 is a modified form of the device.

Fig. 7 shows a modified form of the device wherein the air chamber B2, pipes B3, perforate plate B10, and the baffle plate E are all dispensed with. At the end of the deck B1 is a refuse chute H. It is hooded at H1 and the refuse gate H2 is pivoted thereon, being controlled in exactly the same manner and by the same mechanism as the refuse gate B9 shown in Fig. 4. The coal or lighter material passes off in the same direction, that is, parallel with the axis of the table over the coal chute H3. A weir H4 is vertically adjustable to control the coal stream. A plate H5 is vertically adjustable to control the refuse stream. Plates H4, H5 are independently adjustable and between them and in cooperation with the refuse gate H2 they control the relative proportions of material flowing to the refuse and coal chutes or through the concentrate and the gangue chutes as the case may be. The adjustments depend on the size of the material being treated and its particular, peculiar characteristics. In the case of any particular material, after the proper adjustment has been made, as determined by experiment, it is possible to replace the plates H4 and H5 by a single plate which may be welded or riveted in place.

This plate intersecting the line of flow of the material on the table is peculiar in that it provides a relatively wide space between the points at which the refuse and the coal are removed. Always when dealing with apparatus such as this and when handling coal as it comes from the mine, the horizontal line of cleavage between the refuse bed and the coal bed as they travel down the deck is likely to vary. In the past, it has been necessary to very closely position and watch the dividing member to insure that the coal did not come out with the refuse when the refuse bed got thin, or that refuse did not come out with the coal when the coal bed got thin. My structure with this relatively broad plate insures that the refuse is taken from the bottom of the refuse bed and coal taken from the top of the coal bed and a very considerable vertical deviation or deflection of the dividing line between the two beds may take place without interfering with the product.

It will be understood also that the mechanism for supplying air to the flow box, the mechanism for causing the pulsation of air and the mechanism for permitting pressure variations and pressure pulsations to the refuse gate all may be varied without departing from the general principles of operation of my device.

The use and operation of my invention are as follows:

With the device set up as indicated in the drawings, the fan is started forcing air under pressure into the air chamber. At the same time the butterfly valve rotates. This butterfly valve is so arranged that even when in the closed position it does not entirely cut off the flow of air. As it rotates it thus increases and decreases periodically the amount of air fed to the air chamber, thus causing the pressure in the chamber to vary at a controlled rate of speed, and the air always flows up through the fixed resistance bed, but the pressure available pulsates or varies between a minimum and a maximum. There is never any backward movement of the air in the direction of the resistance bed, but always an outward movement of the air through the bed and through the deck.

Coal or other suitable material is then fed through the spout as indicated onto the upper end of the deck, that is to say, into the trough formed between the perforate deck and the side walls. This material flows down in a continuous stream through the trough, being pulsated or vibrated vertically as it flows generally horizontally under the influence of gravity, no vibration of the device itself occurring or being desired. The pulsating air stream sets up a vibration in the body of flowing material giving it a liquid or fluid characteristic much greater than without the pulsating air flow. This liquid characteristic is sufficient to enable the heavier particles as the flow goes on to gravitate to the bottom and the lighter particles to the top. This forms a bed which toward the lower end consists in light material or coal at the top supported on heavier material, refuse, slate or the like at the bottom, as indicated in Fig. 4 of the drawings. The refuse fills up the refuse discharge passage and builds up a bed of refuse at the bottom of the machine beneath the flowing stream of coal. As this bed builds up it adds resistance to the escape of air and causes an increase in air pressure in the air chamber. This increase in air pressure makes itself felt in the control cup as indicated, thereby raising it and opening the refuse flap valve wider. It will be understood, of course, that the refuse flap valve is ordinarily set so that it is always partially open, but this variation in pressure in the air chamber caused by variation in the resistance to the escape of the air results in opening or closing the refuse valve more or less so as to maintain toward the lower end of the chute or trough on the lower end of the perforate deck, a bed of refuse of the desired thickness. The coal, which by the time it reaches the lower end of the chute will have become separated from the refuse, will run out over the adjustable weir or gate at the lower end while the refuse runs out through the refuse spout.

It will be noted that beyond the refuse spout is a bank or wall of refuse which takes an upwardly inclined position and is kept alive by the pulsating effect of the air coming through the perforate plate B10 and provides a live abutment to bound the lower limit of the refuse bed. The deflector plate extending as it does horizontally across the refuse discharge opening insures that the refuse runs in from the side and not from the top and thus prevents excessive local draining off of the refuse bed which might result in drawing coal down through the refuse discharge. The only adjustments that are necessary are the height of the weir or discharge gate which assists in controlling the depth of the coal and refuse bed immediately at the coal discharge, the speed of the butterfly valve which controls the rate of pulsation, the weight of the float cup which controls the degree of opening of the refuse discharge gate, and the fluid pressure supplied by the fan or pump. Experience shows that under ordinary conditions when these adjustments have been made, the apparatus will thereafter, unless change in product or change in the material treated is desired, continue substantially without change to operate in a satisfactory manner.

In view of the fact that the deck is smooth and unobstructed, there is no tendency toward the hanging or sticking of material on the deck and the constant upward movement of air through the perforations in the deck prevents clogging, plugging or blinding. It is true that wet or soggy material cannot be as satisfactorily separated on any air deck as can dry material, but the presence of wet or soggy material merely decreases for a time to a limited extent the separating effect but does not interfere with the operation of the device beyond that, and moreover, as soon as the wet material has passed off the deck, operation continues without change in any essential respect.

If it is desired to use a fluid medium other than air for separation, water, gases or other liquids may be used, being treated in the same way except that other means may be provided than the butterfly valve for interrupting the flow, or there may be substituted for the butterfly valve and centrifugal fan, a positive displacement pump which will give a pulsating effect. This is shown diagrammatically in Fig. 6.

Preferably, I propose to use a separating fluid medium which is fed through the bed of material to be classified pulsatingly in a continuous forward moving current at varying speed which of course means that normally there is always a pressure in the air chamber, the pressure increasing and decreasing periodically.

It will be noted also that the resistance bed beneath the deck is a fixed immovably held bed, and the material or particles between the under side of the deck and the perforated plates which form this resistance bed are held in fixed position between the deck and the plates so that they do not move, vibrate or have any displacement in response to the current of separating or floating medium. They merely serve as a part of a fixed immovable resistance bed.

The use of the butterfly valve interposed between the fan or pressure source and the resistance bed causes the pulsating current effect, but because the valve never entirely closes the air duct, and since the fan or blower continuously operates, the partial interruption of the current by the valve seems to build up excess pressure which is released as the valve is opened, thereby increasing the pulsating effect.

I claim:

1. In a concentrator, a downwardly inclined pervious unobstructed deck of constant width, means for feeding a continuous sheet of material by gravity across said deck, means for forcing a fluid medium upwardly through the deck and the sheet of material thereon, a fixed high resistance bed on the under side of the deck, the resistance of said bed to fluid flow decreasing toward the lower edge thereof, a perforate plate spaced from but in general alignment with the lower boundary of the pervious deck and adapted to receive and support material as it travels across the lower boundary of the deck, means for forcing a fluid medium upwardly through such plate, a concentrate chute extending clear across the deck and interposed between its lower boundary and said perforate plate, and a baffle plate generally parallel with the direction of flow of material along the deck and spaced above the deck, said baffle plate overlying the said concentrate chute and projecting on its upstream side away from said chute to overlie the resistance bed and on its downstream side away from the chute to overlie said perforate plate.

2. In a concentrator, a downwardly inclined pervious unobstructed deck of constant width, means for feeding a continuous sheet of material by gravity across said deck, means including an air chamber for forcing air upwardly through said deck and the sheet of material thereon, a fixed high resistance bed on the under side of the deck and between the same and said air chamber, the resistance of said bed to air flow decreasing toward the lower edge thereof, a perforate plate spaced from but in general alignment with the lower boundary of the pervious deck and adapted to receive and support material as it travels across the lower boundary of the deck, means for forcing air upwardly through said plate, said means comprising an air pocket bounded by said plate together with an unobstructed air passage between it and the said air chamber, a concentrate chute extending clear across the deck and interposed between its lower boundary and said perforate plate, and a baffle plate generally parallel with the direction of flow of material along the deck and spaced above the deck, said baffle plate overlying said concentrate chute and projecting on its upstream side away from the chute to overlie the resistance bed and on its downstream side away from the chute to overlie the perforate plate.

3. In a concentrator, a downwardly inclined pervious deck, means for feeding a continuous sheet of material by gravity across said deck, means for forcing a fluid medium upwardly through the deck and the sheet of material thereon, a fixed resistance bed on the under side of the deck, the resistance of which to fluid flow decreases toward the lower edge thereof, a weir spaced horizontally from the lower end of said deck and projecting upwardly thereabove over which the tailings may pass, a perforate plate between the weir and the deck, means for forcing the fluid medium upwardly through the plate in the same general manner as it is forced through the deck, a refuse discharge chute extending clear across the deck and between it and the perforate plate, and a baffle plate overlying the refuse discharge chute generally parallel with the deck and located at a point below the weir.

4. In an air concentrator, an air pervious, material supporting deck, means for supplying material to travel thereacross under the influence of gravity, means for effecting a separation of material, toward the discharge end of the deck, along horizontal planes, said last means including apparatus for forcing a continuous uninterrupted column of air under pressure upwardly through the deck and the bed of material thereon, and automatic means responsive to variation in the air pressure beneath the deck for varying the relative proportions of separated material in the discharge zones as they leave the deck.

5. In an air concentrator, an air pervious, material supporting deck, means for supplying material to travel thereacross under the influence of gravity, means for effecting a separation of material, toward the discharge end of the deck, along horizontal planes, said last means including apparatus for forcing a continuous uninterrupted column of air under pressure upwardly through the deck and the bed of material thereon and for imparting a pulsating effect to the air column, and automatic means responsive to variation in the air pressure beneath the deck for varying the relative proportions of separated material in the discharge zones as they leave the deck.

6. In an air separator, an air chamber, a resistance bed and an inclined separation deck in superimposed relation, means for delivering mixed material to the separation deck, means for maintaining air pressure in said air chamber, whereby air is forced through said bed and deck to cause flow of the material down the deck, said material being separated into different layers toward the lower end of the deck, means for withdrawing a limited quantity of material from the lower layer, and means responsive to the increased air pressure in said air chamber due to increasing thickness of said lower layer for correspondingly increasing the amount of material withdrawn.

7. In an air separator, an air chamber, a resistance bed and an inclined separation deck in superimposed relation, means for delivering mixed material to the separation deck, means for maintaining air pressure in said air chamber, whereby air is forced through said bed and deck to cause flow of the material down the deck, said material being separated into different layers toward the lower end of the deck, means including a gate for withdrawing a limited quantity of material from the layer next to said deck, a pneumatic device for controlling said gate, and an air pipe connecting said device with said air chamber, whereby an increased air pressure in the air chamber due to excess accumulation of material on the deck will cause the said gate to release a greater quantity of material.

8. In an air separator, an inclined deck which is pervious to air but impervious to coal or refuse, means for supplying crude coal to said deck at the upper end thereof, a resistance bed beneath said deck, an air chamber beneath said resistance bed, means for maintaining air pressure in said chamber and for modulating the pressure to force a pulsating stream of air up through said bed and deck and the coal thereon, whereby said coal is caused to flow down the deck to the lower end thereof, and whereby the refuse separates from the coal and collects next to the deck by reason of its greater specific gravity, a refuse chute into which the refuse passes from the end of the deck, a gate for partially closing said chute to maintain the same full of refuse and to maintain a layer of refuse on the lower end of the deck of the desired thickness, means for removing coal from above said refuse layer, and means for controlling said gate in accordance with the air pressure in said chamber, whereby if the pressure increases due to excessive thickness of the refuse layer the gate will be opened farther to increase the rate at which refuse is discharged down said chute.

9. In an air separator, an inclined deck which is pervious to air but impervious to coal or refuse, means for supplying crude coal to said deck at the upper end thereof, a resistance bed beneath said deck, an air chamber beneath said resistance bed, means for maintaining air pressure in said chamber and for modulating the pressure to force a pulsating stream of air up through said bed and deck and the coal thereon, whereby said coal is caused to flow down the deck to the lower end thereof, and whereby the refuse separates from the coal and collects next to the deck by reason of its greater specific gravity, means for withdrawing refuse from off the lower end of the deck, means for limiting the rate at which refuse is so withdrawn to cause the refuse to accumulate on the lower end of the deck in a layer of the desired thickness, means for withdrawing coal from off the lower end of the deck above said refuse layer, and means responsive to an increase of air pressure in said chamber due to abnormal thickness of said refuse layer for increasing the rate at which the refuse is withdrawn from the deck to thereby reduce the thickness of said refuse layer.

10. In an air separator, an inclined separating floor or deck which is pervious to air but impervious to the material to be treated, side walls cooperating with said deck to form a trough, a chute for taking off material from the deck at the lower end thereof, a gate for closing said chute below the level of the deck, an air chamber beneath said deck, means for delivering material to the upper end of said deck, means for supplying air under pressure to said air chamber and for intermittently increasing and decreasing the pressure, whereby a pulsating current of air is forced upward through said deck and the material thereon to cause said material to flow down the deck and separate into different layers, the lowermost layer being received in said chute, and means governed by the air pressure in said chamber to regulate the closing of said gate so as to maintain said chute full of material, said last means being also effective to vibrate the gate in response to the pulsating pressure in the air chamber to prevent clogging of the chute.

11. In an air separator, an inclined separating floor or deck which is pervious to air but impervious to the material to be treated, means for continuously delivering material to said deck at the upper end thereof, means for forcing a pulsating current of air upward through the deck and the material thereon to cause said material to flow across the deck toward the lower end thereof, the said deck having side members to confine the flow, said material being separated into upper and lower layers as it flows, a chute for taking off material from the lower end of the deck, means for withdrawing material from said chute at a limited rate, and means responsive to variations in air pressure beneath the deck for regulating the rate so as to maintain the chute full of material at all times, thereby avoiding any substantial leakage of air down the chute which would diminish the air current through the material.

EARL STUMP.